United States Patent [19]

Cogswell et al.

[11] 4,331,974

[45] May 25, 1982

[54] CABLE TELEVISION WITH CONTROLLED SIGNAL SUBSTITUTION

[75] Inventors: Ned W. Cogswell, Salisbury, Md.; Gerald J. Eskin, Iowa City, Iowa; W. Andrew Wright, Jr., Bethlehem, Pa.

[73] Assignee: Iri, Inc., Chicago, Ill.

[21] Appl. No.: 199,256

[22] Filed: Oct. 21, 1980

[51] Int. Cl.³ .............................................. H04N 7/10
[52] U.S. Cl. ....................................... 358/86; 358/84; 358/194.1; 455/2; 455/4; 455/5
[58] Field of Search ......................... 358/86, 84, 9, 181, 358/191.1, 85, 194.1; 455/2, 3, 4, 5, 133, 140, 151

[56] References Cited

U.S. PATENT DOCUMENTS

| | | | |
|---|---|---|---|
| 1,746,690 | 2/1930 | Washington et al. | 455/140 |
| 2,055,164 | 9/1936 | Wichman et al. | 455/133 |
| 2,117,638 | 5/1938 | Walter | 455/133 |
| 2,202,432 | 5/1940 | Santucci | 361/182 |
| 2,330,241 | 9/1943 | Roberts | 455/140 X |
| 2,429,607 | 10/1947 | Capen | 455/152 X |
| 2,469,539 | 5/1949 | Abbott et al. | 455/58 |
| 2,495,916 | 1/1950 | Austin | 455/140 |
| 3,366,731 | 1/1968 | Wallerstein et al. | 358/86 |
| 3,521,168 | 7/1970 | Kaiser et al. | 455/4 X |
| 3,521,198 | 7/1970 | Shahbender | 333/156 |
| 3,639,686 | 2/1972 | Walker et al. . | |
| 3,696,297 | 10/1972 | Otero | 455/151 |
| 3,704,423 | 11/1972 | Kadron et al. | 455/151 |
| 3,714,575 | 1/1973 | Rogalski | 455/57 |
| 3,716,654 | 2/1973 | Hendrickson . | |
| 3,729,581 | 4/1973 | Anderson | 358/114 |
| 3,746,780 | 7/1973 | Stetten et al. . | |
| 3,757,225 | 9/1973 | Ulicki . | |
| 3,789,131 | 1/1974 | Harney . | |
| 3,790,700 | 2/1974 | Callais et al. | 358/84 |
| 3,886,302 | 5/1975 | Kosco | 358/114 X |
| 3,894,176 | 7/1975 | Mellon | 358/114 X |
| 3,899,633 | 8/1975 | Sorenson et al. . | |
| 3,916,091 | 10/1975 | Kirk et al. | 355/4 X |
| 3,934,079 | 1/1976 | Barnhart . | |
| 3,935,534 | 1/1976 | Lewis et al. . | |
| 3,975,585 | 8/1976 | Kirk et al. . | |
| 3,993,955 | 11/1976 | Belcher et al. . | |
| 3,997,718 | 12/1976 | Ricketts et al. . | |
| 4,035,838 | 7/1977 | Bassani et al. . | |
| 4,039,954 | 8/1977 | den Toonder . | |
| 4,081,832 | 3/1978 | Sherman | 358/84 |
| 4,107,734 | 8/1978 | Percy et al. | 358/84 |
| 4,107,735 | 8/1978 | Frohbach | 358/84 |

FOREIGN PATENT DOCUMENTS

| | | | |
|---|---|---|---|
| 87439 | 2/1977 | Australia | 358/84 |
| 1913872 | of 1970 | Fed. Rep. of Germany . | |
| 1918837 | of 1970 | Fed. Rep. of Germany . | |
| 2111590 | of 1972 | Fed. Rep. of Germany . | |
| 238338 | of 1925 | United Kingdom . | |
| 579872 | of 1946 | United Kingdom . | |
| 741541 | of 1955 | United Kingdom . | |
| 811224 | of 1959 | United Kingdom . | |
| 1066931 | 4/1967 | United Kingdom | 358/84 |
| 1184830 | of 1970 | United Kingdom . | |

OTHER PUBLICATIONS

Benson et al., "A Telecontrolled Tunable Receiver Installation," A.W.A. Technical Review, vol. 8, No. 2, 1949, pp. 125-144.
Kazama et al., "Remote TV Control," Electronics, May 13, 1960, pp. 79-81.
Tsubaki et al., "Automatic Broadcasting Program Control Equipment," NEC Research & Development, No. 26, Jul. 1972, pp. 14-25.

*Primary Examiner*—Joseph A. Orsino, Jr.
*Assistant Examiner*—Edward L. Coles
*Attorney, Agent, or Firm*—Fitch, Even, Tabin, Flannery & Welsh

[57] ABSTRACT

A signal substitution system for cable television applies substitute television program signals in at least one substitute channel to the transmission cable along with singal substitution control signals. The signal substitution control signals include a plurality of different terminal command signals and a plurality of different event command signals, each of the terminal command signals including a respective panelist address signal for identifying a respective panelist receiving station, and each of the event command signals including a normal channel identification signal for identifying a normal channel into which a substitute television program is to be switched. A controller at each panelist receiving station responds to the signal substitution control signals by selectively switching a substitute television program into a normal channel. The controller includes a generator of a local panelist address signal and a substitute channel selector for producing a substitute channel select signal corresponding to a substitute channel. A first comparator compares the received panelist address signal of each terminal command signal with the local panelist address signal and produces a first match signal when the signals match. A second comparator compares the received normal channel identification signal with a channel select signal selected by the viewer and produces a second match signal when the signals match. In response to the first and second match signals a substitute channel is substituted for the channel selected by the viewer for a period determined by the signal substitution control signals.

16 Claims, 7 Drawing Figures

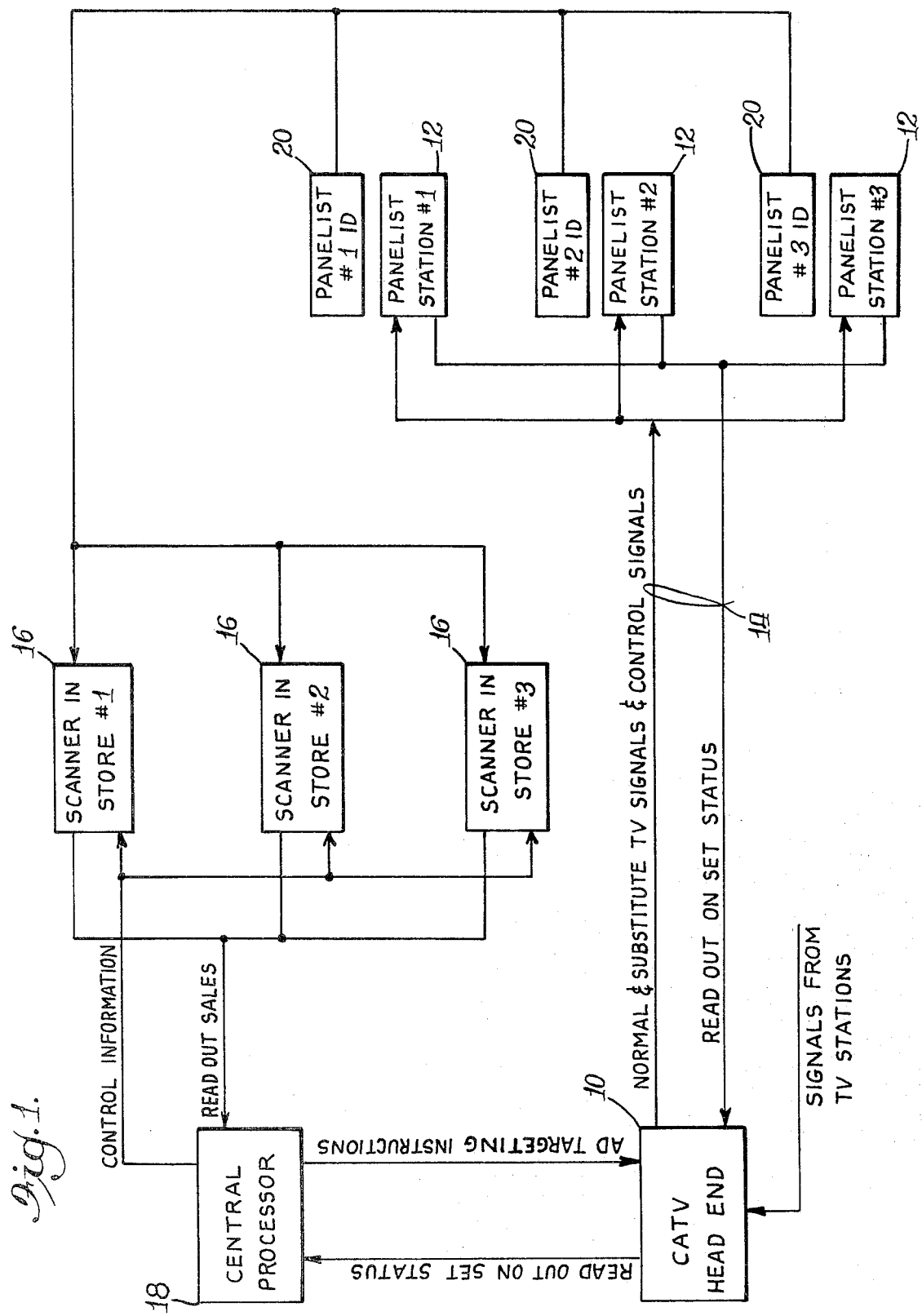

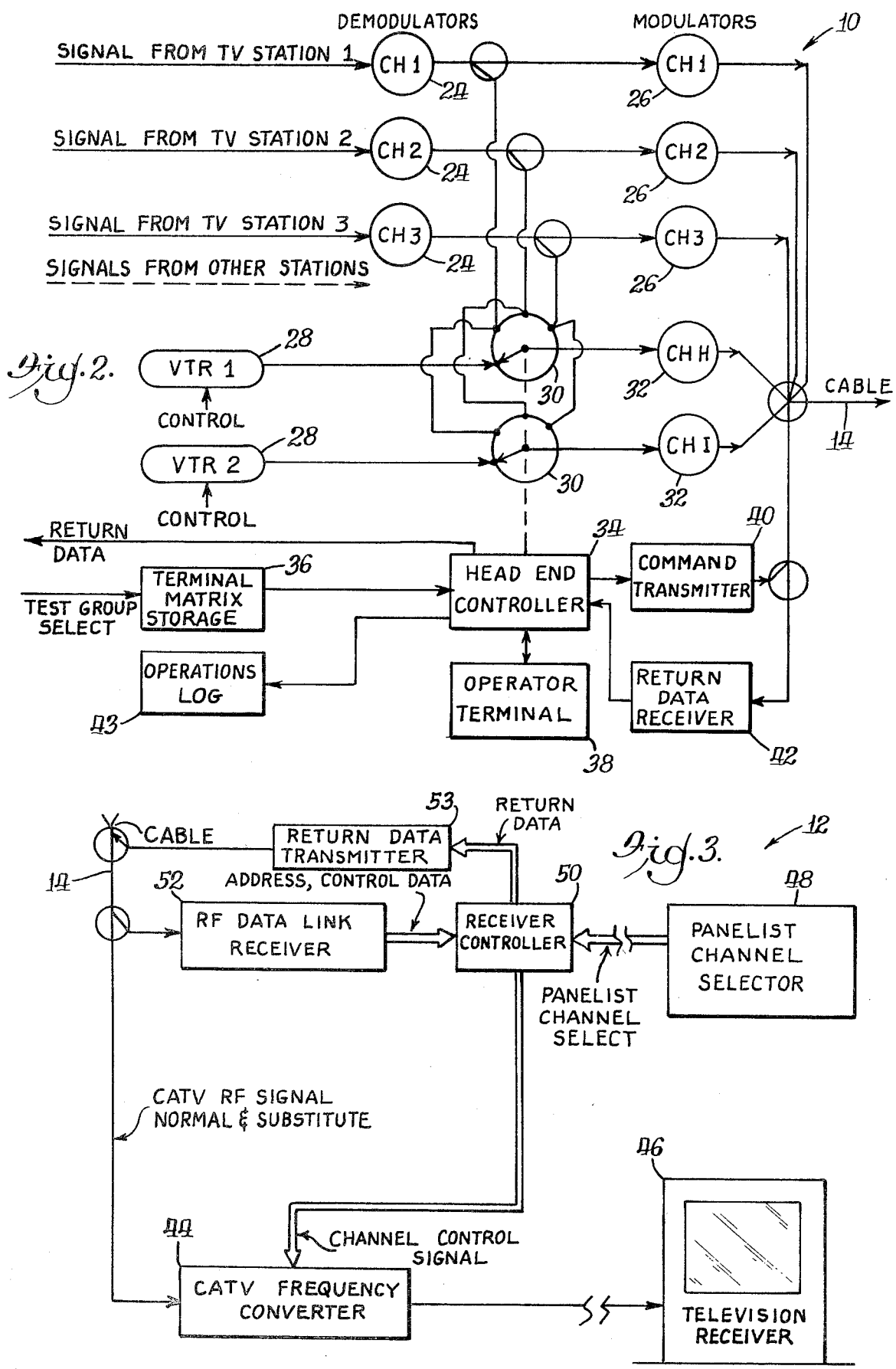

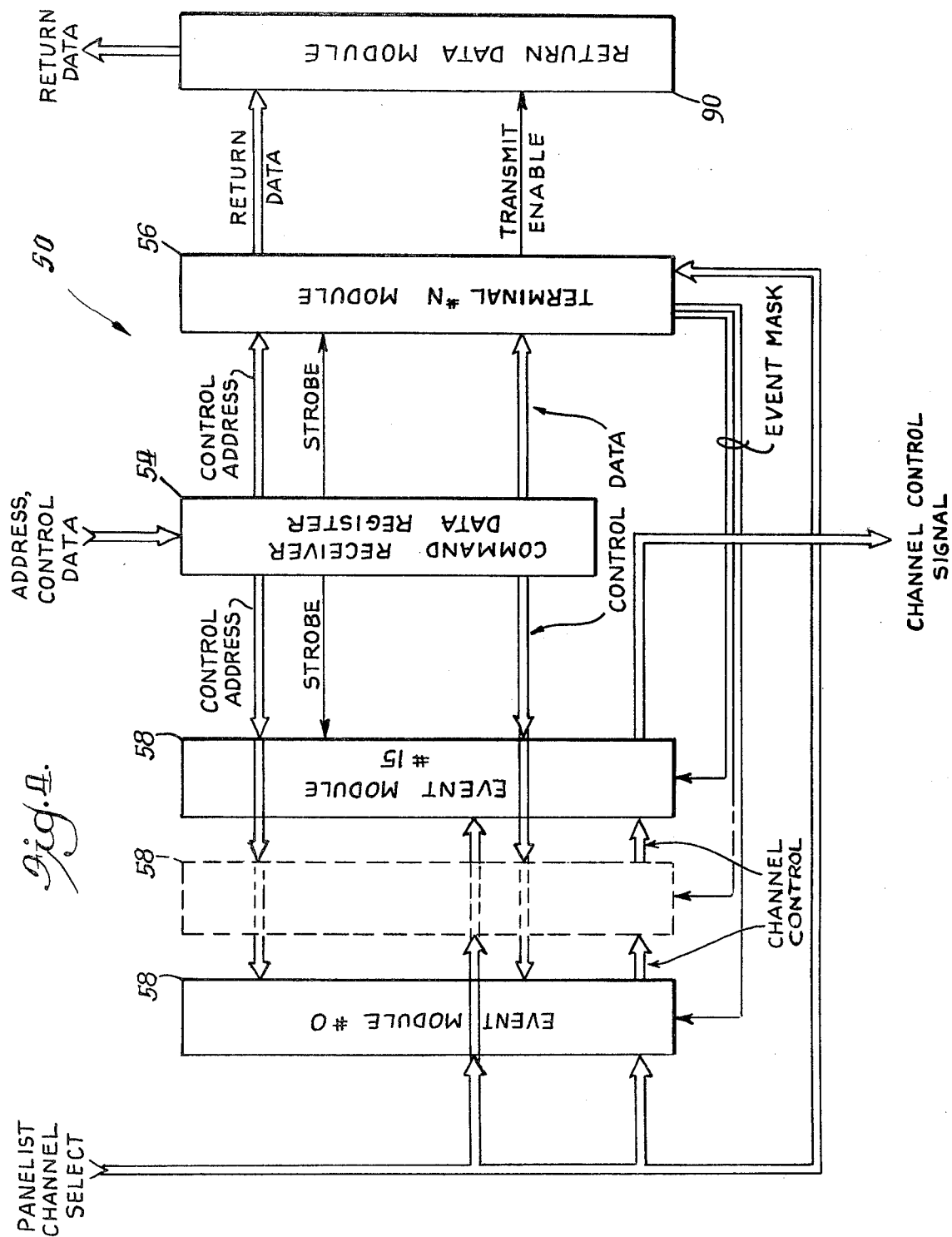

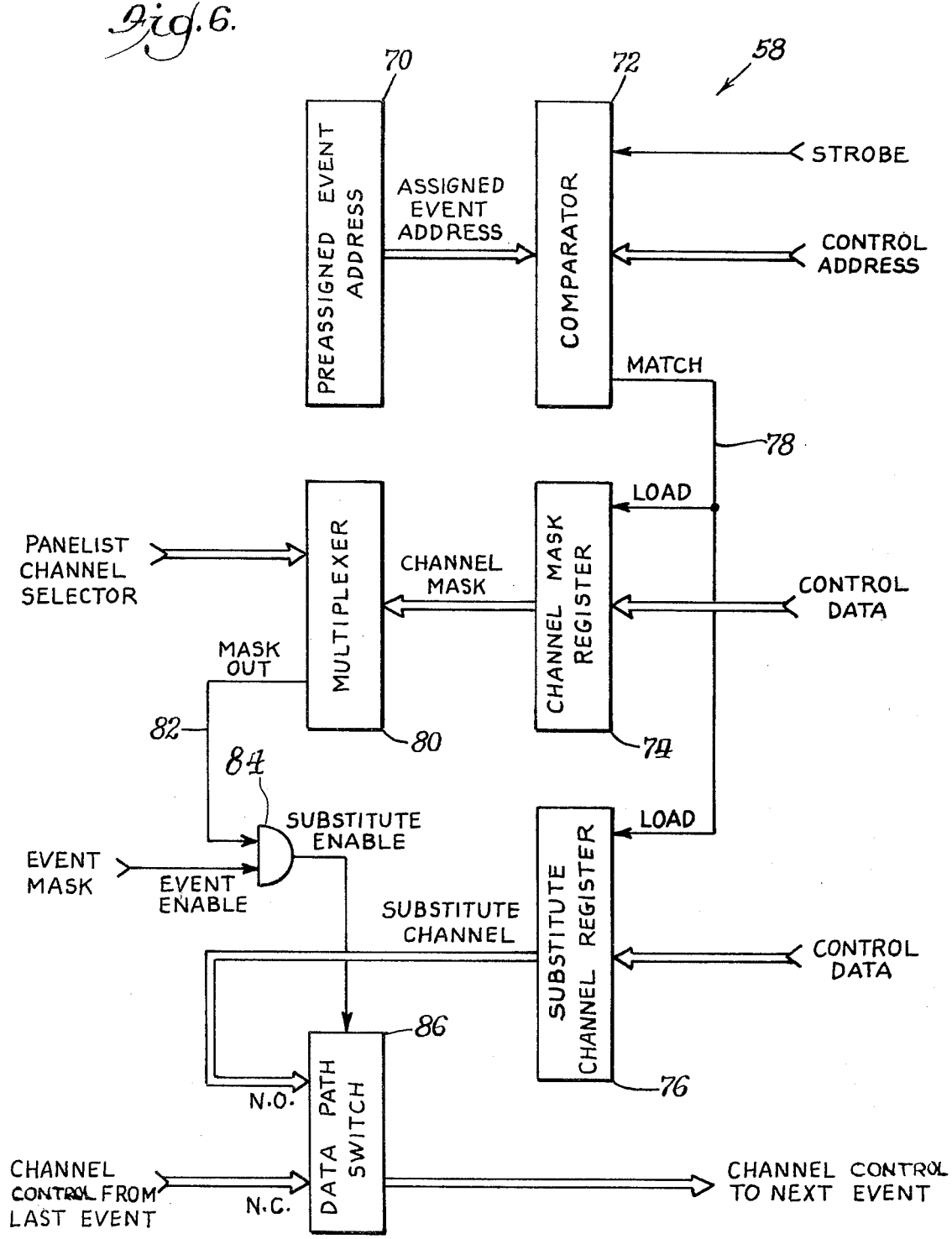

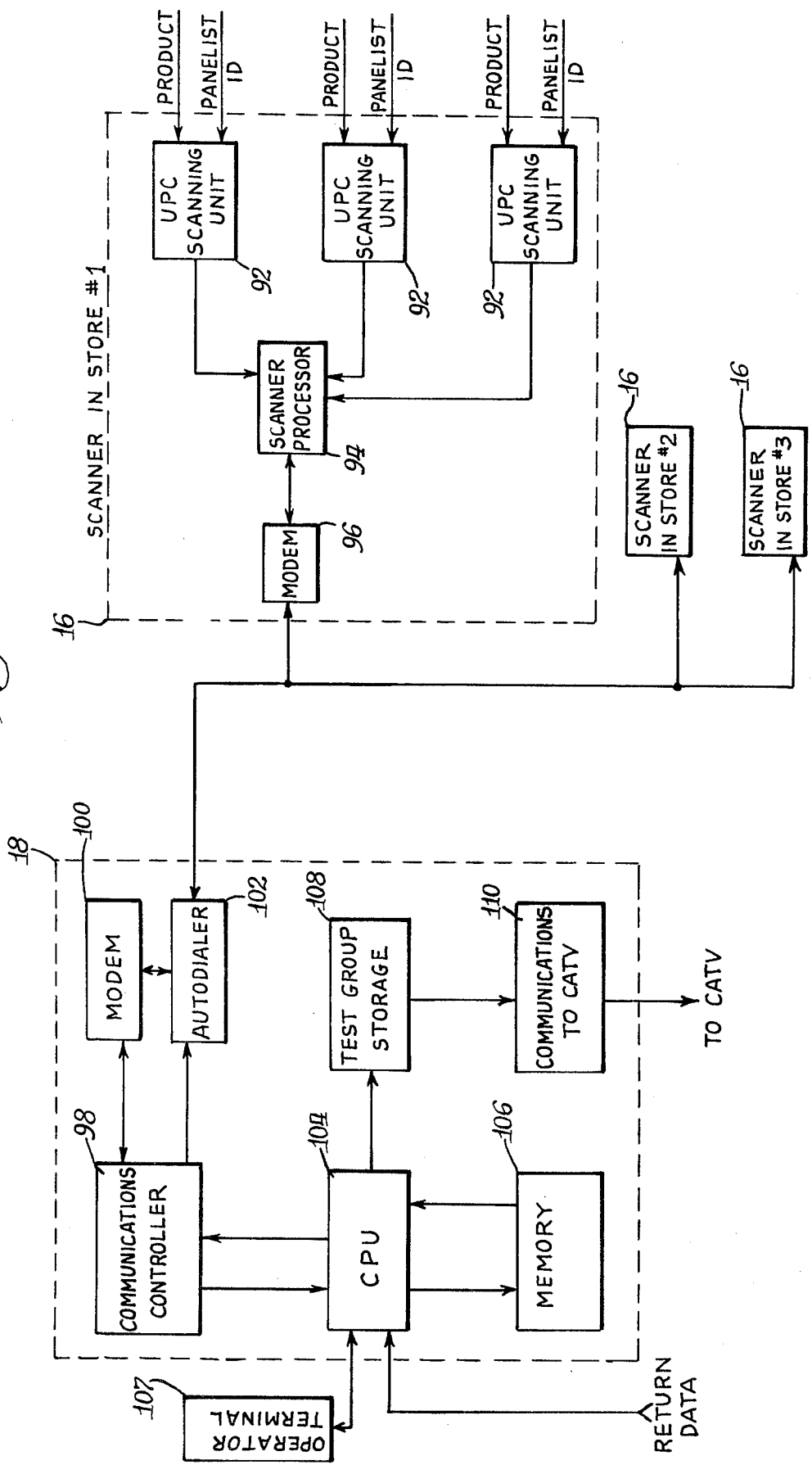

CABLE TELEVISION WITH CONTROLLED SIGNAL SUBSTITUTION

This invention relates to cable television with controlled signal substitution and more particularly to cable television with means for providing selected individual panelists' households with substitute messages, especially in connection with market research.

Conventional market research has involved subjecting selected groups of consumers to particular promotional material and observing their responses. There have, however, been difficulties peculiar to the exposing of the selected group to particular promotional material as well as problems peculiar to measuring their responses. A particular problem is that the method of exposure of the selected group to the promotional material may skew the results; that is, the testing itself may influence the results independently of the material being tested.

The present invention is directed to a cable television system whereby selected substitute programs are selectively directed to selected panelist' households in lieu of normal material in such a manner that the panelists cannot know that they are not receiving the normal material. The invention finds particular applicability in connection with the scanning of panelist response to determine the reactions of respective panelists to the messages they receive.

In respect to television advertising, one approach to market research has been to use cable television with a split cable as illustrated by U.S. Pat. No. 3,366,731, issued Jan. 30, 1968 to Edward Wallerstein for Television Distribution System Permitting Program Substitution for Selected Viewers. In such a split cable system two cables originating from a single transmitting source go out in different directions. One advertisement is inserted on one cable and another advertisement on another cable. A problem that has developed with this is that the split of the cable produces control and test groups that are not properly matched for market testing. That is, the two cables are directed to different neighborhoods at the whim of the cable television company, whereas the needs of market research are particular. It has been known to provide two cables side by side, so that both cables serve the same neighborhoods and are, therefore, likely provide a better match of control groups to test groups. However, even here there is a problem that once the cables are laid, the cables themselves select the groups; that is the television viewers are either on cable A or on cable B and do not admit of special selection to meet the needs of a particular market test. Further, it is not possible to make a test requiring subgroups of individuals on one or the other of the two cables.

Another television market research system is shown in U.S. Pat. No. 3,639,686, issued Feb. 1, 1972 to Harold R. Walker and Ira Kamen for Television Receiver Cut-In Device. In one embodiment of this system an auxiliary television signal is broadcast throughout a broadcast area with a particular control signal identifying the class of viewers that is to be reached by the auxiliary television signal. The television receivers have special decoders for switching to the special signal under certain conditions when the receiver receives a particular address signal identifying the respective receivers as in the class to which the signals are to be transmitted. This system also suffers from the limitation that the classes are determined by the programming of the various receiver decoders and cannot thereafter be selected or subdivided at the will of the market research people.

In accordance with the present invention, the members of the control and test groups are individually determined; that is, a targetable television system is provided wherein panelists can be selected individually to receive particular television messages. The term "panelist" is used herein to identify members of the class of television viewers having the specially adapted control units at their receiving stations to permit selection of particular respective receivers for receiving substitute messages in lieu of normal television messages. However, not every television set coupled to the system need be able to receive the special messages. That is, not all of the television system need be targetable. It is only necessary to have representative participants for panelist response scanning sufficient to provide resulting data that yield statistically significant results. In general the panelists will be selected in accordance with appropriate market research practice. Further, the term "panelist" is used to represent the collection of individuals residing in a participating household.

The term "normal" is used herein to signify the messages, signals or programs provided by the operation of the television system in the absence of the substitution provided by the present invention. It thus may encompass all messages, signals or programs as may be provided in the normal course of television programming, including special messages, signals or programs transmitted and received over the usual channels to which the receivers are ordinarily tunable. The term "program" encompasses commercials and other special messages.

The targetable television system utilized in the present invention comprises a cable television system having a head end station and a plurality of panelist receiving stations. At the head end station is a transmitter for transmitting normal television program signals in normal television transmission channels over a transmission cable to the panelist receiving stations. At each of the panelist receiving stations there is a television set and a panelist channel selector by which a viewer may select a regular channel for the viewing of a normal television program. There is also a cable television frequency converter for receiving television program signals from the transmission cable and, in response to a channel control signal as supplied by the channel selector, selectively converting the received signals in the selected channel to converted television signals suitable for operating the television set.

The present invention comprises a signal substitution system for inserting substitute programs in the programs being received by selected panelists. The substitute programs may be special advertising messages sent as part of a market research study. In accordance with the present invention, the head end station also includes means for applying substitute television program signals in at least one substitute channel to the transmission cable and for applying substitution control signals to the transmission cable. Such substitution control signals include a plurality of panelist address signals for identifying respective receiving stations and a normal channel into which a substitute program is to be switched.

At each panelist receiving station there are control means responsive to the signal substitution signals for selectively switching a substitute television program into a normal channel being viewed. The control means includes a generator of a local panelist address signal corresponding to the respective panelist receiving station and a substitute channel selector for producing substitute channel selector control signals corresponding to at least one substitute transmission channel over which the substitute television program signals are sent. A first comparator compares each of the received panelist address signals with the respective local panelist address signal and produces a first match signal when the compared signals match. A second comparator compares the received normal channel identification signal with the channel select signal selected by the viewer and produces a second match signal when the compared signals match. A switching circuit responds to the first and second match signals to effect the switching of a substitute channel selector control signal to the cable television frequency converter in lieu of the channel control signal selected by the viewer for a period determined by the signal substitution control signals. The selected panelist television receiver thereupon receives the program in the corresponding substitute channel in lieu of the program of the channel selected by the viewer. Thus, the operators of the system can control the television messages being received by the panelists and further can target specific panelists for receipt of particular messages. Those panelists having local panelist address signals that do not match any of the panelist address signals sent by the transmitter do not see the substitute programs. The system operates in such way that the viewer cannot tell whether he is receiving the normal program or a substitute program.

By obtaining data regarding each of the panelists, the panelists can be selected more effectively. In general, detailed demographic data will be accumulated from each of the panelists, who will have volunteered. For each marketing test the panelists may be selected in such manner as to provide the best statistical information for the market research being conducted and provide an adequate control group comparable to the test group being exposed to the substitute messages. The control and test groups may be selected in whatever manner is believed by the market research people to match the relevant criteria. For example, if tests are to be run on dog food, there should be groups balanced on number of dogs. If tests are to be run on cake mixes, there should be groups balanced on cake usage and share trends. The test groups can be selected by first looking at the behavior history of the respective households. The data can include brand purchase data; they can include heaviness of product use; or they can include propensity to buy on special promotions or deals. Custom groups can be picked household by household out of a set of cooperating households (panelists). Any subgroups can be sent one set of advertising messages while the rest get a normal message. All of this substitution is in a manner invisible to the viewers on the same channel at exactly the same point in time. The groups can then be changed almost instantly to do tests for some other products.

In summary, the head end station transmits a signal which contains the household by household addresses for the test group for each test under way. The transmitter sends a test commercial down an unused cable frequency (such as a mid-band frequency, unviewable except upon command from the head end station) in parallel with the normal television commercials. Each panelist receiving station is then interrogated to determine whether or not the respective individual television receiver is to be turned to the test commercial. If so, for the duration of the commercial period the test advertisement is electronically switched to the channel being viewed on that receiver.

An additional feature of the preferred form of the invention is to provide a responder-modem at each panelist receiving station which sends back an electronic record of when the respective television set is on and to what channel it is tuned. This enables the information to be returned to the head end station as to when particular substitute messages are actually being received rather than merely transmitted, and, indeed, when regular messages are being received.

As stated above, this invention finds particular applicability in connection with panelist response scanning for determining the responses of respective panelists to the messages they receive. The invention is particularly useful in systems where responses are obtained without any conscious active responses by the panelists. One such system involves the use of product scanners where all the panelists need do is to identify themselves by producing identification cards at the time of purchase of products. Otherwise they act entirely in accordance with their usual practices. More particularly, for grocery products at least, universal product coding (UPC) has become common. In accordance with one use of the present invention, each panelist is provided with a panelist identification card having a scannable address identification thereon corresponding to the address of his receiving station. The identification card is presented to the cooperating retail stores where he shops, where the card is scanned by a UPC product scanner along with the scanning of purchased products. The work load of the panelist is reduced merely to presenting his identification card. Data capture is electronic and automatic, both for the product and for the panelist identification. The panelist never needs to record anything. All data are recorded by the UPC scanner. The information obtained by the scanner is transmitted to a central processing unit for association and correlation of the data with the advertisements sent out to the respective panelists. That is, the signals transmitted to the respective panelists are identified as the signals sent out by the cable television head end, and the responses of the respective panelists are noted by the scanning units and transmitted back to a central processing unit for association and correlation.

Another aspect of the invention is in targeted advertising. The signal substitution system permits advertising messages to be sent selectively to those for which it is most likely to be effective. From the panelist profiles, it can be determined what sort of products respective panelists might be susceptible to. Then the advertising spots, which are limited in number, can be used conservatively by sending out different advertising messages in a particular time slot, with the respective messages going to where they will be most effective. For example, if a realtor wishes to advertise a number of properties, he could cause the messages to correlate with the apparent wealth of the panelists, transmitting messages relating to expensive properties to the wealthier panelists and messages relating to the less expensive properties to the less wealthy. Product advertisement could well be differentiated on the basis of age or occupation. By making all of the panelists reachable on an individual basis, the present invention will accommodate any or all of such product differentiation.

Another aspect of the invention is in sending special warning messages.

It is, therefore, a primary object of the present invention to provide a targetable cable television system with controlled signal substitution whereby selected panelists may be individually targeted to receive substitute messages.

Other objects and advantages of the present invention will become apparent from the following detailed description, particularly when taken in conjunction with the accompanying drawings, in which:

FIG. 1 is a diagrammatic illustration of a panelist response scanning system utilizing the present invention;

FIG. 2 is a diagrammatic illustration of a cable television head end station according to the present invention as used in the panelist response scanning system shown in FIG. 1;

FIG. 3 is a diagrammatic illustration of one of the panelist receiving stations according to the present invention as used in the panelist response scanning system shown in FIG. 1;

FIG. 4 is a diagrammatic illustration of the receiver controller of the panelist receiving station shown in FIG. 3;

FIG. 6 is a diagrammatic illustration of one of the event modules of the receiver controller shown in FIG. 4; and FIG. 7 is a diagrammatic illustration of the scanners and central processor of the panelist response scanning system shown in FIG. 1.

Figure 5:
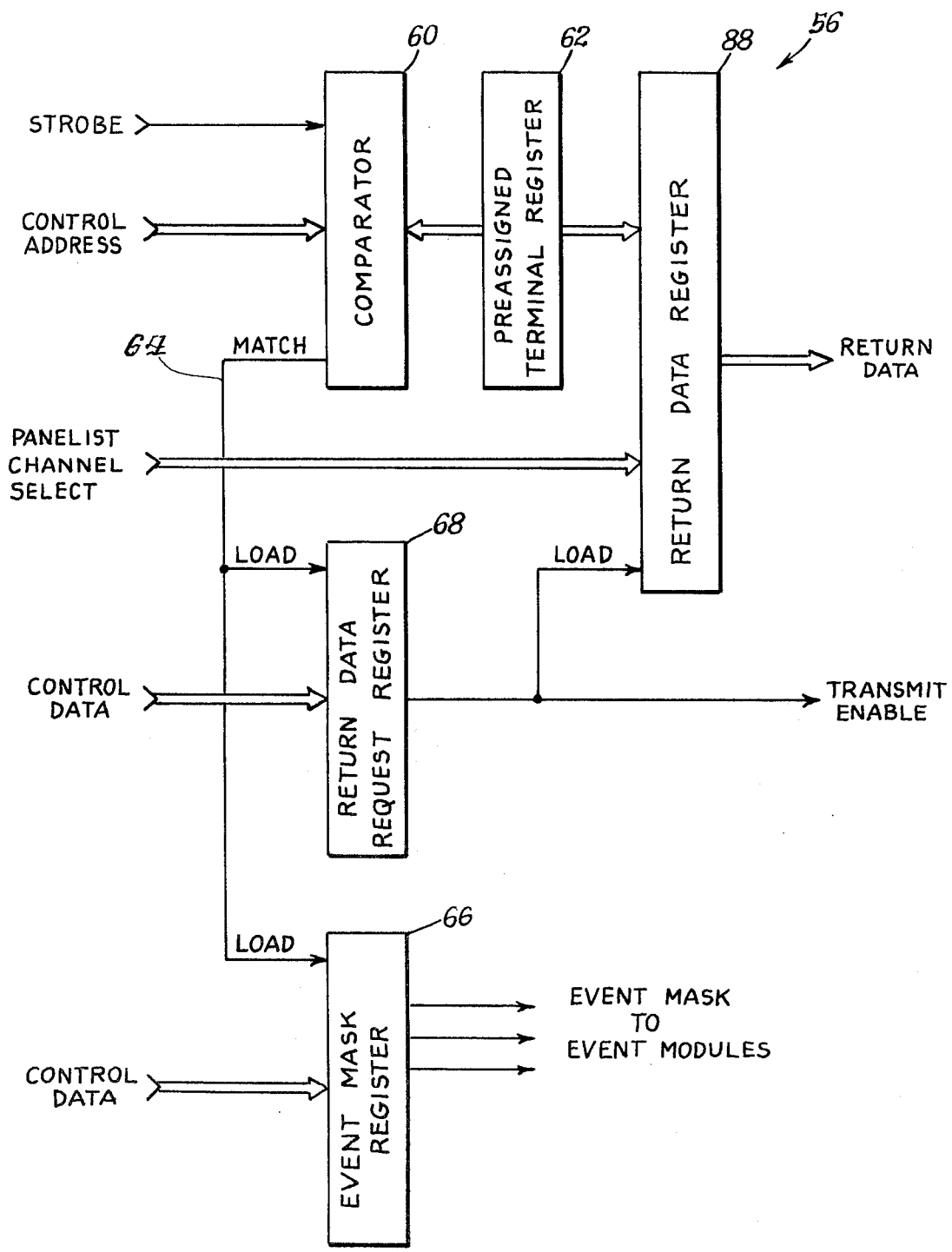
FIG. 5 is a diagrammatic illustration of the terminal module of the receiver controller shown in FIG. 4.

As shown in FIG. 1, the panelist response scanning system utilizing the present invention involves the combination of a targetable cable television system according to the present invention with a plurality of scanning units located at respective retail stores. The targetable cable television used in the preferred embodiment of the invention as shown in FIG. 1 is a cable television system made up of a cable television head end station 10 and a plurality of panelist receiving stations 12 joined by a transmission cable 14. There are but three panelist stations 12 illustrated in FIG. 1; however, it is to be understood that there may be any convenient number for the market research to be conducted. For example, 3,500 has been found to be an acceptable number, and this will be the number of panelist stations taken for the sake of example in the following description. Scanners 16 are disposed in respective stores. Scanners for three stores are shown in FIG. 1. However, this, too, is merely for the sake of illustration. In general, there will be as many stores with such scanners as there are retail outlets of a particular kind in a particular area. It is desirable that the area near the panelist receiving stations 12 be blanketed with participating stores in order to assure statistical accuracy for the market testing. On one side the scanners 16 and the cable television system are coupled by a central processor 18, and on the other side they are coupled by respective panelist identification cards 20, the panelist identification cards 20 corresponding to respective panelist receiving stations 12.

In general, the panelist response scanning system is controlled from the central processor 18. A market researcher provides the central processor with suitable demographic information concerning the panelists. When market research tests are to be performed on a particular product, suitable advertising messages are prepared and furnished to the cable television head end station 10. The market researcher determines when these particular messages are to be sent and the channels suitable for substitution of the messages. This, of course, will be arranged with the sponsors who will have acquired the advertising spots in which the messages are to be substituted. The market researcher will indicate to the central processor 18 the bases for the selections of the test groups for the respective tests. As stated above, there may, for example, be 3,500 panelists for which demographic information is available. The panelists will be volunteers who have agreed to supply information concerning themselves, to have the special panelist receiving stations installed in their homes, and to present their identification cards when shopping. From the information stored therein, including information provided from panelist interviews and sales information acquired from prior operation of the panelist scanning system, the central processor 18 will then determine a test group from the panelists, balancing the test group with a matched control group that will receive the normal messages. The central processor 18 will then forward panelist address targeting instructions for each test to the cable television head end station 10. These instructions will include the tests to be run and the test groups of panelists to be sent substitute programs for the respective tests.

The cable television head end station 10 will receive signals from distant television stations. It will modify the received television signals for application to the cable 14 and will apply normal television signals to the cable 14. There may, for example, be 12 channels for normal television. For the sake of the tuning of the panelist receiving stations, these may correspond to VHF channels 2 to 13. These do not necessarily correspond numerically to the channels of the distant stations. Further, some of the cable channels may contain the same television program signals, as, for example, when two of the distant stations are on the same television network.

At an appropriate time prior to the time that the test commercial is to be transmitted, the head end station 10 will transmit signal substitution control signals to all of the receiving stations on the cable, including all of the panelist receiving stations 12. At an appropriate time, the head end station 10 sends out one or more substitute program signals, and signals indicating the channel into which a signal is to be substituted and the initiation and termination of the substitution.

Each of the respective panelist receiving stations 12 will respond to its own address signal and the other control signals by switching substitute program signals into a particular channel as and when directed. When directed, the respective panelist receiving stations 12 will transmit back to the cable television head end station 10 return data signals indicating the status of the respective sets.

Each of the panelists has his own panelist identification card 20 corresponding to his panelist receiving station 12. In making purchases at the stores in the area, he presents his card 20 at the checkout counters. Each checkout counter has a scanning unit for scanning universal product codes on various products. The respective identification cards 20 are preferably similarly marked with such a code in order that they may be read by the scanning units along with the purchased products. The information from the scanning units is then transmitted to the central processor 18 for association and correlation with the advertising messages being tested. The readout on set status is retransmitted by the cable television head end station 10 to the central processor 18 in order that the information at the central processor may include not merely what has been transmitted by the head end station 10 but what has actually been appearing on the respective television receivers at the panelist receiving stations 12. The central processor 18 may also provide control information to the respective scanners 16 as, for example, in the matter of pricing.

Turning now to the system of the present invention in greater detail, a preferred embodiment of the cable television head end station 10 is illustrated in FIG. 2. Three normal channels are illustrated in FIG. 2; however, it is to be understood that there may be as many channels as desirable for the cable television system, for example, 12. The signals from respective television stations are demodulated to a base band frequency by respective demodulators 24. The respective signals are then remodulated by modulators 26 to frequencies appropriate for the respective cable television channels. At the same time, substitute program signals are developed by video tape recorders 28, two being shown as an example. Other devices may be used for producing such programs. Switches 30 couple the video tape recorders to respective modulators 32 for modulating the respective substitute program signals to appropriate frequencies for transmission on the cable 14. Preferably these substitute channels are at frequencies in the television mid-band, that is, between the frequencies of broadcast channels 6 and 7. Normally the switches 30 will be turned to connect the respective tape recorders 28 to the modulators 32. However, these switches may also be turned to connect the demodulated signals from respective distant stations to the modulators 32, for reasons which will be explained below.

The signal substitution control signals are developed by a head end controller 34 for application to the cable 14. The controller may be best understood by a description of the control system and what is to be achieved. An important end to be achieved is essentially instantaneous switching of a substitute program into a normal program unobtrusively. To make such switching unobtrusive, it is performed during the vertical interval of raster scanning of the receiving television sets. Further the switching is to be performed simultaneously at each of a large number of individual panelist receiving stations 12. In addition, this system is to provide efficient collection, association and correlation of viewership data via a polled return transmission channel.

The specific functions to be implemented by this system are as follows:

(1) Each of the panelists (3,500 in this example) are to be included or excluded from a specific commercial substitution.
(2) Each of the television channels (12 in this example) are to be included or excluded from the specific commercial substitution.
(3) The substitution must be undetectable to a selected panelist viewing a channel selected for substitution.
(4) A plurality of independent commercial substitutions occurring simultaneously are to be handled; in addition, each of these substitutions can have contiguous, independent substitutions preceding or following them.

Several provlems arise from these system objectives. First is the desire for the capacity to utilize a single substitute commercial transmission and control facility for back to back independent commercial substitutions. Assuming ¼ second turn around time were acceptable, control messages would have to be sent at a minimum rate of 14,000 commands per second or an information rate of 168,000 baud (for 3,500 panelists and 12 channels). Such a rate is sufficiently high as to incur a noticeable cost, and is therefore undesirable.

An even more severe transmission rate requirement arises from the object of undetectable commercial substitution. In order to switch video programs invisibly, the substitution must be made during the vertical blanking intervals between the visible picture fields. This amounts to a time period of approximately 1 millisecond for standard NTSC (National Television Standards Committee) video format. If one attempted to send individual control messages to each of the panelists during such a short interval, the control messages would have to be sent at a minimum rate of 3.5 million commands per second or an information rate of over 42 million baud. This transmission rate would require an unacceptably expensive control channel bandwidth.

Both of these problems are surmounted in the present system by a transformation of the problem from that stated above in order to take advantage of certain statistics of commercial substitution market research. This solution to the problem is based on the following two statistics of commercial substitution market research:

(1) Television commercials are grouped into commercial breaks of under a dozen commercials per break per network. There is sufficient time between breaks to transmit reliably any reasonable quantity of setup data to all terminals. Additionally, commercial time is one of the most expensive resources of the market researcher. The percentage of total commercial time purchased per market is sufficiently small to make the probability of more than 6 substitutions per commercial break over all networks vanishingly small.
(2) For each commercial purchased there are only a few independent variables related to the commercial substitution system, such as the commercial being overlayed, the substitute commercials, time of day, and frequency. The degrees of freedom are relatively limited, so only a few independent tests can simultaneously use the same commercial substitution. Under these circumstances the set of all possible permutations of simultaneous tests is of the same order of magnitude as the set of all tests. Normally a single test uses a single test group.

Before each series of tests, the central processor identifies the test group to be used in each commercial substitution. Each member of each test group is identified by an address assigned to his terminal equipment. Hence, for each given commercial substitution, called an "event," a list of the members of the respective test group is all that is needed to determine which panelist terminals are to respond to the respective substitution. These lists are transmitted to the respective head end stations 10 well in advance of their use, such as a week or so in advance, and are stored in a terminal matrix storage device 36. The substitute commercials are also sent to the head end stations 10 for play back over the video tape recorders 28.

Before each commercial break, an operator at the head end station 10 utilizes an operator terminal 38 to enter into the head end controller 34 a series of event definitions for the upcoming break. An event is defined for each commercial substitution to be made during the upcoming break. If two simultaneous substitutions are to be made, an event is defined for each one. Each event definition includes the following information: a list of the normal television channels on which the c0ommercial is to appear, the substitute channel used for transmitting the substitute commercial, and the list of panelist receiving stations 12 to respond to this substitution. As noted earlier, the list of events associated with any given commercial break is short enough for timely entry by the operator between breaks.

In accordance with the illustrated embodiment of the invention, the transmission of this control information is broken into two sets of transmissions to the panelist receiving stations 12. The first set consists of a series of terminal commands, individually addressed to each panelist station. This information can be transmitted at any time before the beginning of the commercial break. The second consists of event commands transmitted to all panelist stations simultaneously. These transmissions contain all time dependent control data.

In setting up for a station break, the operator transfers from the terminal matrix storage device 36 to the head end controller 34 the addresses of the panelist receiving stations 12 for each of the test groups for each of a number of events. In the preferred embodiment, 16 events are possible, although event 0 is ordinarily reserved for equipment testing. The data may be stored in the form of a matrix of panelist addresses by events. That is, for each panelist there will be a determination of for which of the upcoming events that panelist is to be a part of the test group. This information is transmitted by the head end controller 34 by way of a command transmitter 40 and the cable 14 in binary form by transmitting each panelist address and after each such address a single binary bit for each event, i.e., yes or no, true or not true. These are the terminal commands. Such control signals also include suitable synchronizing and validating bits. One bit may be a command to return a set status signal. As the terminal commands are sent in series with a terminal command for each panelist receiving station, these terminal commands take a time for transmission very long relative to a raster scan, but very short relative to the time between commercial breaks. They can thus be sent between commercial breaks without initiating an event at the panelist receiving stations 12.

Event commands need only identify into which normal channels a substitute program is to appear and on which substitute channel the substitute program is transmitted. In the system illustrated, each event command also includes an event address signal. These event commands will be set up by the head end operator in the controller 34. These, too, may be in a matrix formed of events by channel. That is, for each event there will be a determination of which substitute channel is to be switched in and into which normal channels it is to be switched. There is a capability of switching into multiple channels for a single event in order to meet the condition where the same normal programs are being carried on more than one channel, as in the case of two different channels carrying the same network. To initiate an event, the operator causes the controller 34 to transmit by the command transmitter 40 an event command comprising an event address signal followed by a single binary bit for each channel, i.e., yes or no, true or not true. To terminate an event, the operator causes the transmitter 40 to transmit an event command in the form of an event address with no true channel bits. Again, such control signals also include suitable synchronizing and validating bits. The event commands are necessarily very short, orders of magnitude shorter than the succession of terminal commands, and, hence, can be transmitted almost instantaneously during a vertical interval.

In coordination with the initiation of an event, the head end operator starts the respective video recorder playing the substitute message. This need not be simultaneously therewith, however. That is, the respective switch 30 may be turned to connect the substitute channel to the normal channel so that for a particular event the normal signals are sent over the substitute channel as well as over the normal channel. The substitute channel can then be switched in shortly before the commercial break so all the operator has to do is switch in the respective video tape recorder 28. This reduces the number of things the operator has to do at once. Some of these operations by the operator may be performed automatically; however, typically the timing of commercials is inexact and is performed manually.

Thus, the head end controller 34 initiates the command process by transmission of the terminal commands column by column to each panelist station 12, each terminal command comprising a terminal address corresponding to the column number being transmitted, and an event mask vector e bits long, e being the number of possible events, 16 in this example. As will be described in greater detail below, each panelist receiving station 12 has a preassigned terminal address which it compares with the address field of the terminal commands. If a command address matches the preassigned address, the corresponding event mask vector is stored in an event mask register. Typically, sufficient time exists after the manual event definition to transmit an entire 3500 column matrix many times before the actual commercial break begins. This insures reliable reception of the data by all panelist receiving station equipment.

The remaining command in formation is transmitted during the commercial break in the form of event commands. The event commands transmit the event matrix along with substitution start and stop timing and substitute channel assignments, and identification of the channels in to which substitutions are to be made. Each event command transmission consists of an event address corresponding to the column number being transmitted, and a channel mask vector c bits long, c being the number of normal channels, 12 in this example. All panelist receiving stations 12 contain e substantially identical event command modules, respective ones of which respond in unison to every event command. In addition to the channel mask vector, a substitute channel assignment is transmitted with each event transmission. Substitution is initiated by the transmission of a non-zero channel mask, and terminated by the transmission of a zero mask. Since a non-zero mask is the final link necessary to initiate substitution in the illustrated system, vertical interval video substitution can be achieved by synchronizing this transmission with the video signal. Redundancy can be introduced by repeating this transmission during the vertical interval of several successive video fields.

A by-product of the two step control process described above is the ability to handle polled return data. A valuable extension to a targetable commercial marketing research system is the ability to collect viewing statistics of each panelist and to determine if commercials targeted to specific panelists have actually been viewed. Return data collection can be efficiently added to the terminal command phase of the above control procedure. During this phase, the terminal command matrix is transmitted column by column to the panelist receiving stations 12 in the form of event mask vectors individually addressed to each station. These commands can be extended one bit to include an optional return transmission request. Upon request, each panelist receiving station 12 returns the channel number of the currently viewed station or zero if the television is off. These data can then be received by a return data receiver 42 at the head end controller 34 and passed on to the central processor 18 as desired for association and correlation with purchasing data received from the scanners 16.

All operations of the head end controller 34 may be recorded on an operations log printer 43.

In FIG. 3 is illustrated one of the panelist receiving stations 12 of the present invention as used in the panelist response scanning system illustrated in FIG. 1. All panelist receiving stations 12 are substantially identical except that each will have its own preassigned panelist address means and the respective television receivers are at the choice of the respective panelists. As shown in FIG. 3, the panelist stations 12 include a conventional cable television frequency converter 44 which receives both the normal and substitute program signals from the cable 14 and operates to convert the signal frequency of a selected channel to convert the signal from that channel to a base frequency to which a television receiver 46 is tuned. A panelist channel selector 48 is used for tuning the cable television frequency converter 44 to the desired normal channel in order to receive the program on the selected channel at the television receiver 46. The panelist channel selector 48 may be a hand-held channel selector which would conventionally be connected directly to the converter 44. However, in accordance with the present invention a receiver controller 50 is interposed between the panelist channel selector 48 and the frequency converter 44 in order to permit the controlled substitution of program signals. A radio frequency data link receiver 52 is coupled to the cable 14 for receiving and demodulating the signal substitution control signals sent from the head end station. It converts the received signals into digital address and control data signals for application to the receiver controller 50. Similarly, a return data transmitter 53 modulates return data for transmission from the receiver controller 50 to the head end station 10.

The receiver controller 50 is shown in greater detail in FIG. 4. As there shown, the address and control data signals are applied to a command receiver data register 54 which operates upon each command to produce a control address signal and a control data signal, each in binary form with the address and data bits in parallel. Each separate command is identified as a separate command by synchronizing and validity bits in a conventional manner in order to identify and isolate each command. Upon determining the validity of a command, the command receiver data register 54 produces a strobe signal. Thus the command receiver data register 54 puts out digital address signals with a strobe signal successively for each of the command signals as they are received from the cable 14. The signals corresponding to each command are simultaneously applied from the command receiver data register 54 to a terminal module 56 and a plurality of event modules 58. In the illustrated embodiment there are 16 event modules 58 numbered from 0 to 15, of which only the event 0 module and the event 15 module are shown in full line.

The terminal module 56 is shown in greater detail in FIG. 5. As there shown, the control addresses from the command receiver data register 54 are applied to a comparator 60 for comparison with a local panelist address signal from a preassigned terminal address means 62. This local panelist address signal corresponds to and uniquely identifies a particular panelist receiving station 12. Upon receipt of a strobe signal from the command receiver data register 54, the comparator 60 compares the then current command address with the local panelist address signal and provides an output signal on a line 64 when the addresses match. As each of the command address signals uniquely identifies a particular terminal or a particular event, the comparator will produce an output signal on the line 64 only when the source of command signals includes the address of the respective panelist station 12 as contained in the preassigned terminal address means 62. The appropriate bits of the control data are applied to an event mask register 66 and a return data request register 68. The comparator output signal on the line 64 is applied as a load signal to the event mask register 66 and the return data request register 68 to load the respective registers with the respective control data designated for the addressed panelist station 12.

In summary, the binary data contained in a terminal command are entered into the command receiver data register 54 as received. The address component is applied to the comparator by operation of the strobe signal indicating valid data. The control data bits indicating events and the bit indicating the desire for return data are applied in parallel to the event mask register 66 and return data request register 68, respectively, for entry only when these control data are contained in the terminal command directed to the particular addressed panelist station. Any other terminal command or any event command is ignored by the terminal module 56, and none of the corresponding control data for such commands are entered in the registers 66 and 68.

In FIG. 6 is illustrated one of the event modules 58. All of the event modules 58 for a given receiver controller 50 are substantially identical except for their respective preassigned event address means 70. Corresponding event modules 58 of all panelist stations 12 are substantially identical in order that corresponding events may be addressed to all panelists simultaneously. All of the control address signals from the command receiver data register 54 are applied in parallel to a comparator 72 for comparison with an assigned event address signal from the preassigned event address means 70. The strobe signal is applied to the comparator 72 in the same manner as the strobe signal is applied to the terminal module 56. Similar control data are applied in parallel to a channel mask register 74 and a substitute channel register 76.

The comparator 72 acts in the same manner as the comparator 60 to determine whether or not the control address matches the assigned event address. As each assigned address signal is different for each event and is different from any terminal address, the comparator 72 uniquely identifies command signals commanding a particular event. As in the terminal module 56, the comparator 72 provides an output signal on a line 78 for loading the control data contained in the corresponding event command into the respective registers 74 and 76.

Thus the channel mask register 74 will, when commanded by the event command signals, indicate the channels into which substitute program signals are to be introduced in the particular event. Similarly, the substitute channel register 76 will be made to contain identification of the substitute channel from which the substitution is to be made.

A multiplexer 80 receives a panelist channel select signal from the normal channel selector 48 to indicate the normal channel selected by the viewer for viewing. The multiplexer 80 compares the panelist channel select signal with the channel mask signal from the channel mask register 74. The channel mask signal may be in the form of binary signals in parallel applied to the input terminals of respective two input terminal AND gates. The digital signal may be in the form of the output of a mechanical selector switch of the panelist channel selector 48. The panelist channel select signal may be applied to the second terminal of a respective AND gate, so that when the panelist channel select signal matches an output from the channel mask register 74, an output signal appears on a line 82, as by use of a wired OR gate, for application to a substitute enable AND gate 84. The other input terminal of the substitute enable AND gate 84 is connected to the event mask register 66, which indicates whether or not a particular event is scheduled for the respective panelist receiving station 12. When both inputs are in the enabling condition, the AND gate 84 directs a substitute enable signal to a data path switch 86.

Channel select signals both from the substitute channel register 76 and from the panelist channel selector 48 are applied to the data path switch 86 of the event 0 module, which, as commanded, passes one or the other as a channel control signal. Each of the subsequent event modules 58 receives the channel control signal from a prior event module 58 instead of the panelist channel select signal. Thus the panelist channel select signal is applied to the event 0 module first and, as commanded, is thereafter passed as a channel control signal in series through the respective data path switches 86 to succeeding modules unless a substitute channel select signal is switched in. Under the control of the substitute enable signal from the substitute enable gate 84, each data path switch 86 determines whether the prior channel select signal is to be passed directly through the data path switch or the substitute channel signal is to be substituted. Whichever signal is selected by the data path switch 86, that signal passes on to the next event module 58 until, after the event 15 module, the last selected channel select signal is applied to the cable television frequency converter 44 (FIG. 3). It may be noted that the purpose of having the data path switches 86 connected in series is to avoid the anomalous condition that would otherwise arise if by mistake a particular panelist station 12 were selected for two simultaneous events. With the series connection of the data path switches 86, the last event module in line that effects switching in of a substitute channel will control. Of course, if no substitute enable gate 84 is enabled, the panelist channel select signal passes through all of the event modules 58 from the normal channel selector 48 to the frequency converter 44.

The panelist channel select signals, the substitute channel select signals and the resulting channel control signals are preferably digital signals with parallel bits, as the signals applied to the multiplexer 80. Alternatively they may be series digital signals or analog signals as needed for compatibility with the particular cable television frequency converter 44.

To summarize the operation of the panelist stations 12, the terminal command signals are selectively acted upon by the respective address terminal modules 56 to preset each event mask register 16 to the upcoming events to which the respective panelist receiving station 12 is to respond. These signals are transmitted in advance of the events, when there is plenty of time. At the time of each event, an event command is accepted by a respective event module 58, and if the normal channel selector 48 of the respective panelist receiving station 12 is tuned to a channel designated for that event, an output signal is developed on the line 82. If at the same time the respective terminal is scheduled for that event as indicated by the event enable signal from the event mask register 66, the substitute enable gate 84 causes the data path switch 86 to effect the signal substitution. The signal substitution will end with another event command addressed to the same particular event module and containing a control data signal to the channel mask signal register 74 designating no channels. This removes the enabling signal from the line 82 and hence returns the data path switch 86 to its normally closed condition in which the channel select signal from a prior event passes right on through.

In the return data operation, when the control data applied to the return data request register 68 indicate that return data is to be provided, the return data request register 68 applies a load signal to a return data register 88 to which the panelist channel select signal is applied from the normal channel selector 48 in the digital form as applied to the multiplexer 80. The preassigned terminal address means 62 is also coupled to the return data register 88. Upon the occurrence of the load signal from the return data register 68, the preassigned terminal address and the panelist channel select signal are loaded into the return data register 88. The return data register 88 is coupled to a return data module 90 (FIG. 4), whereby, upon application of a transmit enable signal from the return data request register 68 to the return data module 90, return data are applied to the cable 14. Thus, whenever the terminal command signal addressed to a particular panelist receiving station 12 indicates a request for return data, the return data module 90 will transmit the return data immediately following the respective terminal command. The return data are then transmitted to the head end controller 34 (FIG. 2), whence they may be transmitted immediately or from time to time to the central processor 18.

Panelist response to particular test programs may be determined by the scanners 16 as shown in greater detail in FIG. 7. Each panelist has a panelist identification card 20 corresponding to his panelist station 12. Whenever he goes to a participating store, he presents his identification card at a checkout counter in making his purchases of products. As shown in FIG. 7, each checkout counter has a UPC scanning unit 92. The checker causes the UPC scanning unit to scan the respective products in a conventional manner. The checker also scans the panelist identification card 20. Alternatively, the checker may enter the panelist identification address by a key-in process. The scanner 16 in each store will have as many UPC scanning units 92 as checkout counters. It will also have a single scanner processor 94 for processing the data from all scanning units 92 in that store. This may be a conventional scanner processor. For the present invention, the scanner processor 94 is connected to a modem 96 coupled to a communications controller 98 in the central processor 18. The communications controller 98 periodically acts to interrogate the scanner processor 94 by way of a modem 100 and an autodialer 102. Periodically, such as in the middle of the night, the communications controller 98 commands the autodialer 102 to interrogate all of the scanners 16 one after the other to cause the respective scanner processors 94 to transmit back to the communications controller 98 all of the product and panelist information acquired during the day. These return signals will include panelist, product and store data, whereby for each purchase the product, store and panelist can be identified at the communications controller 98. Other information transmitted preferably includes the price of each product, the total purchases by each panelist at a particular time, and the time of each purchase.

The communications controller 98 may also operate through the modem 100 and autodialer 102 to exercise certain controls over the scanners 16. For example, the price to be charged for particular products for the sake of a particular market test may be entered. Of course, the retailer must be informed of the prices being charged. The central processor 18 may, if desired, act as the so-called host for a particular store, providing all control and information for a particular scanner processor 94.

The communications controller 98 is coupled to a central processing unit 104 for both transmitting information and receiving commands. The central processing unit 104 may operate to perform a number of steps, such as cleaning data and integrating incoming data with past UPC data and demographic information. It may accommodate the entry of information concerning the use of product coupons or other promotional material. It may also accommodate the entry of market conditions. The central processing unit 104 may operate to place data in a memory 106 and retrieve information therefrom. An operator terminal 107 provides access to the central processing unit for the entry of data and the giving of instructions. The operator may thus instruct the central processing unit 104 to perform various operations at different times. Upon receipt of instructions to select a test group of panelists on certain criteria, the central processing unit 104 will cause test groups to be selected and stored in a test group storage device 108 for particular tests. The operator may instruct the building of test groups based upon past behavior and the individual test needs of a client. The information from the test group storage device 108 is then from time to time transmitted to the head end station 10 through a communications to cable television unit 110.

Although a preferred embodiment of the invention has been disclosed, various modifications in the system and its manner of operation may be made within the scope of the invention. For example, the system may be used for making what can be considered a negative test, where it is the normal advertising message that is being tested. That is, the message under test may be that being broadcast by the distant television stations. This will reach those subscribers on the cable system other than the panelists designated for a substitute message. The substitute message may then be something unrelated, such as a public service message. By this use of the invention, the market researchers can be certain the selected panelists do not receive the message under test, and the differences in purchasing can be judged accordingly.

It is also possible to have more than one test group at a time and provide different substitute messages for the different test groups. In this respect it is within the scope of the invention to switch a special message into a normal channel at the head end station in lieu of a message received from a distant station.

In one manner of operation the test group is changed from event to event in a series of tests, such as by varying the number of times different panelists receive a particular advertisement.

The market research utilizing the present invention may be integrated with additional promotional activities, such as controlled newspaper advertising and the use of coupons. Price differentials in different stores may be included in the research. The data accumulated and utilized may also include data concerning the behavior of nonpanelists.

There may be conventional means for assuring receipt of valid signals, with invalid or suspect signals being ignored. Multiple sending of the commands will then provide the signals ignored earlier.

What is claimed is:

1. In a cable television system having head end means at a head end station, transmission cable, and a plurality of receiving means at respective panelist receiving stations, said head end means including means for applying normal television program signals in normal television channels to said transmission cable, and each of said receiving means including panelist channel selector means under control of a viewer for selecting a normal channel for viewing of a respective normal television program, said panelist channel selector means producing a panelist channel select signal indicative of said television channel, a television receiver, and a cable television frequency converter for receiving television program signals from said transmission cable and responsive to a channel select signal for selectively converting received television program signals in the respective television channel to converted television program signals acceptable to said television receiver and applying the respective converted television program signals to said television receiver:

a targetable signal substitution system comprising means at said head end station for applying substitute television program signals in at least one substitute channel to said transmission cable, and means at said head end station for applying signal substitution control signals to said transmission cable, said signal substitution control signals including a plurality of different terminal command signals each of which includes a panelist address signal for identifying a respective panelist receiving station, and said signal substitution control signals further including a normal channel identification signal for identifying a normal channel into which a substitute television program is to be switched; and control means at each panelist receiving station responsive to said signal substitution control signals for selectively switching a substitute television program into a normal channel, said control means including means for generating a local panelist address signal, substitute channel selector means for producing a substitute channel select signal corresponding to a substitute channel, first comparison means for comparing each received panelist address signal with said local panelist address signal and producing a first match signal when said compared address signals match, second comparison means for comparing said received normal channel identification signal with said panelist channel select signal and producing a second match signal when said compared channel identification and channel select signals match, and means responsive to said first and second match signals for switching a substitute channel select signal to said cable television frequency converter in lieu of the channel select signal selected by the viewer for a period determined by said signal substitution control signals, whereby for said period said television receiver receives the program in the corresponding substitute channel in lieu of the program of the channel to which the normal channel selector is set.

2. A signal substitution system according to claim 1 including means at each said receiving station for transmitting return signals to said head end station corresponding to the respective said local panelist address signal and the channel selected by the respective viewer when the respective television receiver is turned on, and means at said head end station for utilizing said applied return signals.

3. A signal substitution system according to claim 1 wherein said means for switching said substitute channel control signal to said cable television frequency converter so switches such signal only for the period during which said compared channel identification and channel select signals match.

4. A signal substitution system according to claim 3 wherein said signal substitution control signals include a normal channel identification signal identifying no normal channel, whereby said second comparison means is disabled from producing said second match signal and said period is thereby terminated.

5. A signal substitution system according to claim 1 wherein said signal substitution control signals include a period termination signal, and said control means determines the end of said period from said period termination signal.

6. A signal substitution system according to claim 1 wherein said signal substitution control signals include identification of the timing of said signal substitution, and said control means is responsive to said signal substitution control signals by controlling the timing of the onset and the period of substitution of a respective substitute television program.

7. A signal substitution control system according to claim 1 wherein one of said signal substitution control signals is a substitution start signal and another of said signal substitution control signals is a substitution terminate signal.

8. A signal substitution system according to any one of claims 1 to 7 wherein said means for applying substitute television program signals includes means for applying a plurality of substitute television program signals in a plurality of respective substitute channels to said transmission cable, said signal substitution control signals include a substitute channel identification signal for identifying a substitute channel from which substitute television signals are to be switched, and said control means includes means responsive to said substitute channel identification signal for producing said substitute channel select signal.

9. In a cable television system having head end means at a head end station, transmission cable, and a plurality of receiving means at respective panelist receiving stations, said head end means including means for applying normal television program signals in normal television channels to said transmission cable, and each of said receiving means including panelist channel selector means under control of a viewer for selecting a normal channel for viewing of a respective normal television program, said panelist channel selector means producing a panelist channel select signal indicative of said television channel, a television receiver, and a cable television frequency converter for receiving television program signals from said transmission cable and responsive to a channel select signal for selectively converting received television program signals in the respective television channel to converted television program signals acceptable to said television receiver and applying the respective converted television program signals to said television receiver:

a targetable signal substitution system comprising means at said head end station for applying substitute television program signals in at least one substitute channel to said transmission cable, and means at said head end station for applying signal substitution control signals to said transmission cable, said signal substitution control signals including a plurality of different terminal command signals and a plurality of different event command signals, each of said terminal command signals including a respective panelist address signal for identifying a respective panelist receiving station, and each of said event command signals including a normal channel identification signal for identifying a normal channel into which a substitute television program is to be switched; and control means at each panelist receiving station responsive to said signal substitution control signals for selectively switching a substitute television program into a normal channel, said control means including means for generating a local panelist address signal, substitute channel selector means for producing a substitute channel select signal corresponding to a substitute channel, first comparison means for comparing the received panelist address signal of each terminal command signal with said local panelist address signal and producing a first match signal when said compared address signals match, second comparison means for comparing said received normal channel identification signal with said panelist channel select signal and producing a second match signal when said compared channel identification and channel select signals match, and means responsive to said first and second match signals for switching a substitute channel select signal to said cable television frequency converter in lieu of the channel select signal selected by the viewer for a period determined by said signal substitution control signals, whereby for said period said television receiver receives the program in the corresponding substitute channel in lieu of the program of the channel to which the normal channel selector is set.

10. A signal substitution system according to claim 9 including means at each said receiving station for transmitting return signals to said head end station corresponding to the respective said local panelist address signal and the channel selected by the respective viewer when the respective television receiver is turned on, and means at said head end station for utilizing said applied return signals.

11. A signal substitution system according to claim 9 wherein said means for switching said substitute channel control signal to said cable television frequency converter so switches such signal only for the period during which said compared channel identification and channel select signals match.

12. A signal substitution system according to claim 11 wherein one of said event command signals includes a normal channel identification signal identifying no normal channel, whereby said second comparison means is disabled from producing said second match signal and said period is thereby terminated.

13. A signal substitution system according to claim 9 wherein said event command signals include a period termination signal, and said control means determines said period from said event command signals.

14. A signal substitution system according to claim 9 wherein said event command signals include identification of the timing of said signal substitution, and said control means is responsive to said event command signals by controlling the timing of the onset and the period of substitution of a respective substitute television program.

15. A signal substitution control system according to claim 9 wherein one of said event command signals is an event start signal and another of said event command signals is an event terminate signal.

16. A signal substitution system according to any one of claims 9 to 15 wherein said means for applying substitute television program signals includes means for applying a plurality of substitute television program signals in a plurality of respective substitute channels to said transmission cable, at least one of said event command signals includes a substitute channel identification signal for identifying a substitute channel from which substitute television signals are to be switched, and said control means includes means responsive to said substitute channel identification signal for producing said substitute channel select signal.

* * * * *